United States Patent
Miyata et al.

(10) Patent No.: US 9,376,736 B2
(45) Date of Patent: Jun. 28, 2016

(54) METHOD FOR SEPARATING AND RECOVERING RARE-EARTH ELEMENTS

(71) Applicant: Hitachi Metals, Ltd., Minato-ku, Tokyo (JP)

(72) Inventors: Motoyuki Miyata, Tokyo (JP); Hiroki Yamamoto, Tokyo (JP); Hiroshi Sasaki, Tokyo (JP); Toshio Yasuda, Tokyo (JP); Katsuyoshi Furusawa, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 81 days.

(21) Appl. No.: 14/370,666

(22) PCT Filed: Dec. 21, 2012

(86) PCT No.: PCT/JP2012/083256
§ 371 (c)(1),
(2) Date: Jul. 3, 2014

(87) PCT Pub. No.: WO2013/103099
PCT Pub. Date: Jul. 11, 2013

(65) Prior Publication Data
US 2014/0356258 A1  Dec. 4, 2014

(30) Foreign Application Priority Data

Jan. 6, 2012  (JP) ................................ 2012-000961
Jan. 6, 2012  (JP) ................................ 2012-000963

(51) Int. Cl.
| | | |
|---|---|---|
| *C22B 59/00* | (2006.01) | |
| *C01F 17/00* | (2006.01) | |
| *B09B 3/00* | (2006.01) | |
| *C22B 7/00* | (2006.01) | |

(52) U.S. Cl.
CPC ............... *C22B 59/00* (2013.01); *B09B 3/0016* (2013.01); *C01F 17/00* (2013.01); *C01F 17/0006* (2013.01); *C22B 7/006* (2013.01); *Y02P 10/234* (2015.11)

(58) Field of Classification Search
None
See application file for complete search history.

(56) References Cited

U.S. PATENT DOCUMENTS

| 6,110,433 A | 8/2000 | Kleinsorgen et al. |
| 2010/0314260 A1 | 12/2010 | Fujita et al. |
| 2010/0319491 A1 | 12/2010 | Sugahara et al. |

FOREIGN PATENT DOCUMENTS

| AU | 2010202408 A1 | 1/2011 | |
| CA | 2 707 933 A1 | 12/2010 | |
| CN | 1171171 A | 1/1998 | |
| CN | 101928829 A | 12/2010 | |
| EP | 2 264 196 A1 | 12/2010 | |
| JP | 10-204554 A | 8/1998 | |
| JP | 10-510879 A | 10/1998 | |
| JP | 2001-303149 A | 10/2001 | |
| JP | 2003-73754 A | 3/2003 | |
| JP | 2009-249674 A | 10/2009 | |
| JP | 2010-285680 A | 12/2010 | |
| JP | 2011-1584 A | 1/2011 | |
| JP | 2011-74408 A | 4/2011 | |
| JP | 2012-219326 A | 11/2012 | |
| JP | 2013-139617 A | 7/2013 | |
| WO | WO 96/19841 A | 6/1996 | |
| WO | 2012/137727 | * | 10/2012 |

OTHER PUBLICATIONS

English-language translation of International Search Report dated Apr. 9, 2013 (two (2) pages).

* cited by examiner

*Primary Examiner* — Steven Bos
(74) *Attorney, Agent, or Firm* — Crowell & Moring LLP (57) ABSTRACT

A method for separating and recovering a plurality of rare-earth elements, the method including a step of introducing, into a liquid, a mixture containing a rare-earth oxychloride and a rare-earth chloride, the rare-earth oxychloride constituted from a rare-earth element different from a rare-earth element constituting the rare-earth chloride, thereby obtaining an insoluble matter containing the rare-earth oxychloride and a liquid in which the rare-earth chloride is dissolved, a step of recovering the rare-earth oxychloride from the insoluble matter, and a step of recovering the rare-earth chloride from the liquid in which the rare-earth chloride is dissolved.

22 Claims, 9 Drawing Sheets

METHOD FOR SEPARATING AND RECOVERING RARE-EARTH ELEMENTS

FIELD OF THE INVENTION

The present invention relates to a method for separating and recovering rare earth elements and, more specifically, it relates to a method for separating and recovering rare earth elements from a composition containing plural kinds of rare earth elements.

BACKGROUND OF THE INVENTION

In recent years, importance of sustainable conservation of global environments has been recognized and industrial systems, traffic systems, products, etc. capable of minimizing the use of fossil fuels have been developed vigorously. Such environmental feasible systems and products include, for example, wind power generation systems, railway systems, hybridcars, and electric cars.

Main devices used for such environmental feasible systems and products include highly efficient rotary electric machines (motors and generators). Magnets containing rare-earth elements (so-called rare-earth magnets) are used for the highly efficient rotary electric machines. For example, rare-earth magnets used for highly efficient rotary electric machines of hybrid cars are required to have high coercive force even under high temperature environments, for which rare-earth magnets containing rare earth elements such as neodymium (Nd) or dysprosium (Dy) have been used. At present, rare-earth magnets are indispensable for highly efficient rotary electric machines and further expansion of demand is expected in the feature.

On the other hand, due to increase in the cost of rare-earth materials caused by geographical localization of rare-earth material resources, methods of decreasing the amount of rare-earth ingredients used in the rare-earth magnets and methods for separating and recovering rare-earth elements from spent rare-earth magnets have been investigated. Examples of the separation and recovery method include a method for separating and recovering rare earth elements from cutting dusts (sludges) generated in production process of rare-earth elements and from magnet wastes.

As a method for separating and recovering rare-earth elements from compositions containing plural kinds of rare-earth elements (hereinafter referred to as "rare-earth compositions") such as rare-earth magnets, Document 1 discloses a separation method utilizing the difference of solubility between sulfates of neodymium (Nd) and dysprosium (Dy). Document 2 discloses a method of leaching sludges with an acid and then applying solvent extraction. Document 3 discloses a method of halogenizing rare-earth elements in a mixture containing plural kinds of rare-earth elements or compounds thereof, thereby separating bivalent rare-earth halides and trivalent rare-earth halides by utilizing the difference of properties between them. Further, Document 4 discloses a method of reacting sludges or magnet wastes with iron chlorides and separating and recovering rare-earth elements as chlorides.

DOCUMENTS ON PRIOR ARTS

Patent Document

Document 1: Japanese Unexamined Patent Application Publication No. 2010-285680

Document 2: Japanese Unexamined Patent Application Publication No. 2009-249674

Document 3: Japanese Unexamined Patent Application Publication No. 2001-303149

Document 4: Japanese Unexamined Patent Application Publication No. 2003-73754

DISCLOSURE OF THE INVENTION

Problems to be Solved by the Invention

The methods disclosed in the Documents 1 and 2 can cause considerable effects on the global environment since strong acids at extremely high concentration and solvents of high volatility are used in the methods. The method disclosed in the Document 2 requires multi-step separation since separation rate for one step is not sufficient. The methods disclosed in the Documents 3 and 4 have a problem that the separation rate of rare-earths is low.

In view of such problems, the present invention intends to provide a method for separating and recovering rare-earth elements which causes less effect on the global environment and is capable of further improving the separation rate.

Means for Solving the Problem

An aspect of a method for separating and recovering rare-earth elements according to the present invention has a following feature. A method for separating and recovering a plurality of rare-earth elements of the present invention includes a step of introducing, into a liquid, a mixture containing a rare-earth oxychloride and a rare-earth chloride, the rare-earth oxychloride constituted from a rare-earth element different from a rare-earth element constituting the rare-earth chloride, thereby obtaining an insoluble matter containing the rare-earth oxychloride and a liquid in which the rare-earth chloride is dissolved, a step of recovering the rare-earth oxychloride from the insoluble matter, and a step of recovering the rare-earth chloride from the liquid in which the rare-earth chloride is dissolved.

Another aspect of a method for separating and recovering rare-earth elements according to the present invention has a following feature. A method for separating and recovering a plurality of rare-earth elements of the present invention includes a step of introducing, into a liquid, a mixture containing a first rare-earth oxychloride and a second rare-earth oxychloride, the first rare-earth oxychloride constituted from a rare-earth element different from a rare-earth element constituting the second rare-earth oxychloride, thereby obtaining a liquid in which the first rare-earth oxychloride is dissolved, a step of recovering the first rare-earth oxychloride from the liquid in which the first rare-earth oxychloride is dissolved, and a step of recovering the second rare-earth oxychloride from an insoluble matter which is not dissolved in the liquid.

Advantageous Effects of the Invention

According to the present invention, rare-earth elements can be separated and recovered from a rare-earth composition with less effect on the global environment and at a high separation rate. For example, rare-earth elements can be regenerated for use at a high separation rate from sludges generated in production processes of rare-earth magnets or from spent magnet wastes. Accordingly, the methods of the present invention can utilize global resources effectively and contribute to sustainable conservation of global environments.

DESCRIPTION OF EMBODIMENTS

Embodiments of a method for separating and recovering rare-earth elements according to the present invention are specifically described below. Hereinafter, examples will be described for separating and recovering Nd and Dy from a rare-earth magnet (NdFeB magnet) as an example of a rare-earth composition containing neodymium (Nd), dysprosium (Dy), and the like.

However, the present invention is not restricted to the examples but is applicable also to a method for separating and recovering rare-earths used in fluorescent materials and cathode ray tubes, for example. Further, the invention is applicable also to a method for separating and recovering rare-earth elements other than Nd and Dy, such as lanthanum (La), cerium (Ce), and praseodymium (Pr). While examples will be described in the following for a method for separating and recovering two kinds of rare-earth elements (Nd and Dy) contained in the rare-earth composition, the method of the present invention can separate and recover respective rare-earth elements even when three or more rare-earth elements are contained in the rare-earth composition.

(1) Basic Principle of Separating and Recovering Rare-Earth Elements

A basic principle for separating and recovering rare-earth elements is to be described, exemplifying a method for separating and recovering Nd and Dy from a mixture of neodymium chloride ($NdCl_3$) and dysprosium oxychloride (DyOCl) and a method for separating and recovering Nd and Dy from a mixture of neodymium oxychloride (NdOCl) and dysprosium oxychloride (DyOCl).

First of all, an example of a method for separating and recovering Nd and Dy from a mixture of neodymium chloride ($NdCl_3$) and a dysprosium oxychloride (DyOCl) is to be described.

At first, a method of forming neodymium chloride ($NdCl_3$) and dysprosium oxychloride (DyOCl) is to be described. However, neodymium chloride ($NdCl_3$) and dysprosium oxychloride (DyOCl) may not always be formed by this method since the present invention is not restricted to a method of forming neodymium chloride ($NdCl_3$) and dysprosium oxychloride (DyOCl).

Figure 1A:
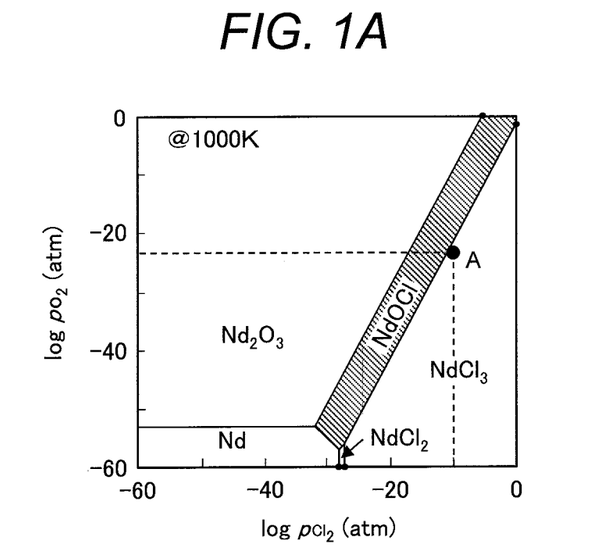
FIG. 1A is a chemical potential diagram for Nd—O—Cl at 1000K.
Figure 1B:
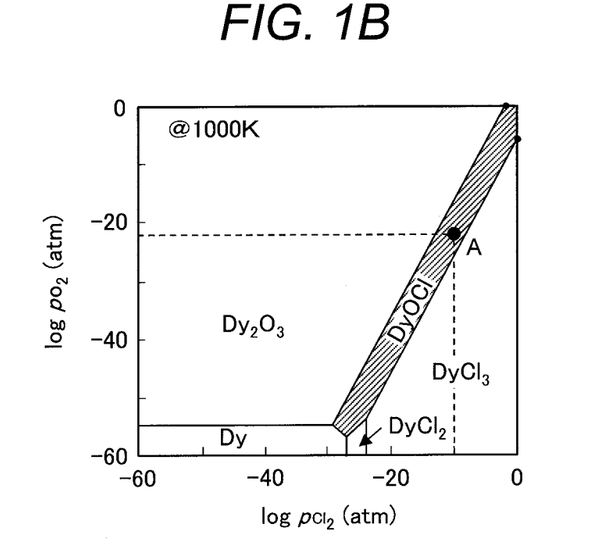
FIG. 1B is a chemical potential diagram for Dy—O—Cl at 1000K.

FIG. 1A is a chemical potential diagram for Nd—O—Cl and FIG. 1B is a chemical potential diagram for Dy—O—Cl. In FIG. 1A and FIG. 1B, the abscissa represents a chlorine potential and the ordinate represents an oxygen potential. FIG. 1A and FIG. 1B show chemical potential diagrams at 1000K as a typical example of temperature.

In any of the chemical potential diagrams, an oxide ($Nd_2O_3$, $Dy_2O_3$) is stable in a region where the oxygen potential is high and the chlorine potential is low, a trivalent chloride ($NdCl_3$, $DyCl_3$) is stable in a region where the chlorine potential is high and the oxygen potential is low, and metal (Nd, Dy) is stable in a region where both of the oxygen potential and the chlorine potential are low. Further, in a region where the chlorine potential is low in the state of the chloride, a state of divalent chloride ($NdCl_2$, $DyCl_2$) is observed between the state of chloride and metal. Further, a stable region of oxychloride (NdOCl, DyOCl) is present between the region of the oxide and the region of the chloride.

In the chemical potential diagrams of FIG. 1A and FIG. 1B, by setting potentials of chlorine and oxygen (partial pressure) to points A where neodymium chloride ($NdCl_3$) and the dysprosium oxychloride (DyOCl) are stable, it is possible to form a mixture of neodymium chloride ($NdCl_3$) and dysprosium oxychloride (DyOCl) from a rare-earth composition in which neodymium chloride ($NdCl_3$) and dysprosium oxychloride (DyOCl) are present together and Nd and Dy are contained.

By introducing the thus formed mixture of neodymium chloride ($NdCl_3$) and dysprosium oxychloride (DyOCl) into a liquid, neodymium chloride ($NdCl_3$) and dysprosium oxychloride (DyOCl) can be separated and recovered.

Figure 2:
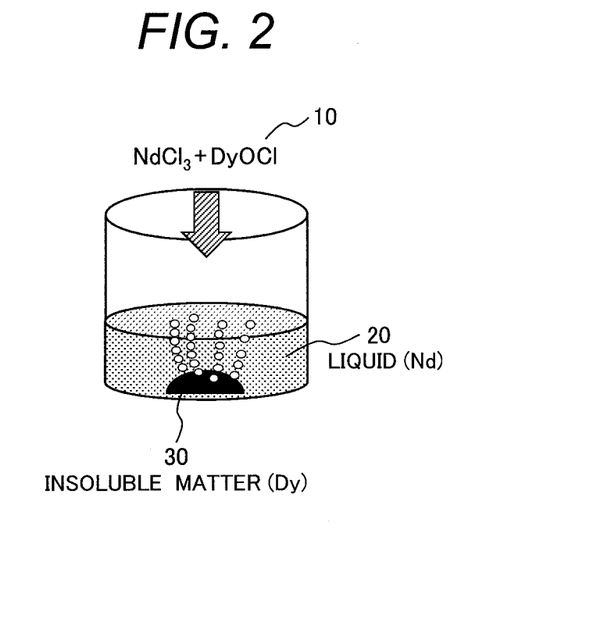
FIG. 2 is a schematic view of a step for separating and recovering neodymium chloride ($NdCl_3$) and dysprosium oxychloride (DyOCl) with a liquid.

FIG. 2 is a schematic view of a process for separating and recovering neodymium chloride ($NdCl_3$) and dysprosium oxychloride (DyOCl) using a liquid. As shown in FIG. 2, when a mixture 10 containing neodymium chloride ($NdCl_3$) and dysprosium oxychloride (DyOCl) is introduced in a liquid 20, neodymium chloride ($NdCl_3$) is dissolved in the liquid 20 and dysprosium oxychloride (DyOCl) is not dissolved in the liquid 20 but forms an insoluble matter 30. Thus, neodymium chloride ($NdCl_3$) and dysprosium oxychloride (Dy- OCl) can be separated and recovered from the mixture 10 containing neodymium chloride ($NdCl_3$) and dysprosium oxychloride (DyOCl).

Then, an example of a method for separating and recovering Nd and Dy from a mixture of neodymium oxychloride (NdOCl) and dysprosium oxychloride (DyOCl) is to be described.

At first, a method of forming neodymium oxychloride (NdOCl) and dysprosium oxychloride (DyOCl) is to be described. However, neodymium oxychloride (NdOCl) and dysprosium oxychloride (DyOCl) may not always be formed by this method since the present invention is not restricted to a method of forming neodymium oxychloride (NdOCl) and dysprosium oxychloride (DyOCl).

In the chemical potential diagrams of FIG. 1A and FIG. 1B, by setting potentials of chlorine and oxygen (partial pressure) to regions where neodymium oxychloride (NdOCl) and dysprosium oxychloride (DyOCl) are stable, it is possible to form a mixture of neodymium oxychloride (NdOCl) and dysprosium oxychloride (DyOCl) from a rare-earth composition in which neodymium oxychloride (NdOCl) and dysprosium oxychloride (DyOCl) are present together and Nd and Dy are contained.

By introducing the thus formed mixture of neodymium oxychloride (NdOCl) and dysprosium oxychloride (DyOCl) into a liquid, neodymium oxychloride (NdOCl) and dysprosium oxychloride (DyOCl) can be separated and recovered by utilizing the difference of solubility to the liquid.

Figure 3:
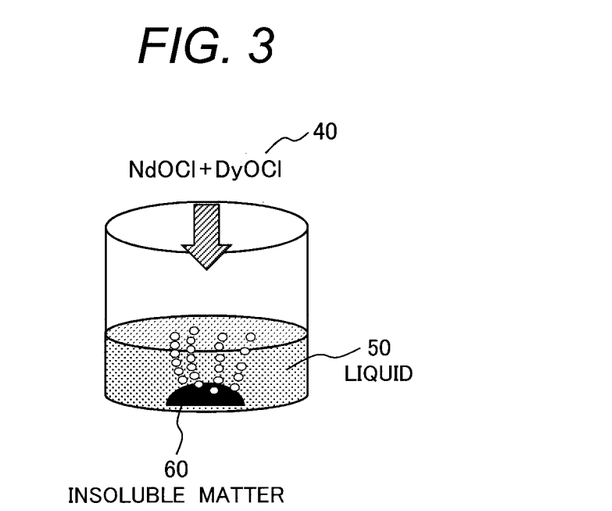
FIG. 3 is a schematic view of a step for separating and recovering neodymium oxychloride (NdOCl) and dysprosium oxychloride (DyOCl) with a liquid.
Figure 15:
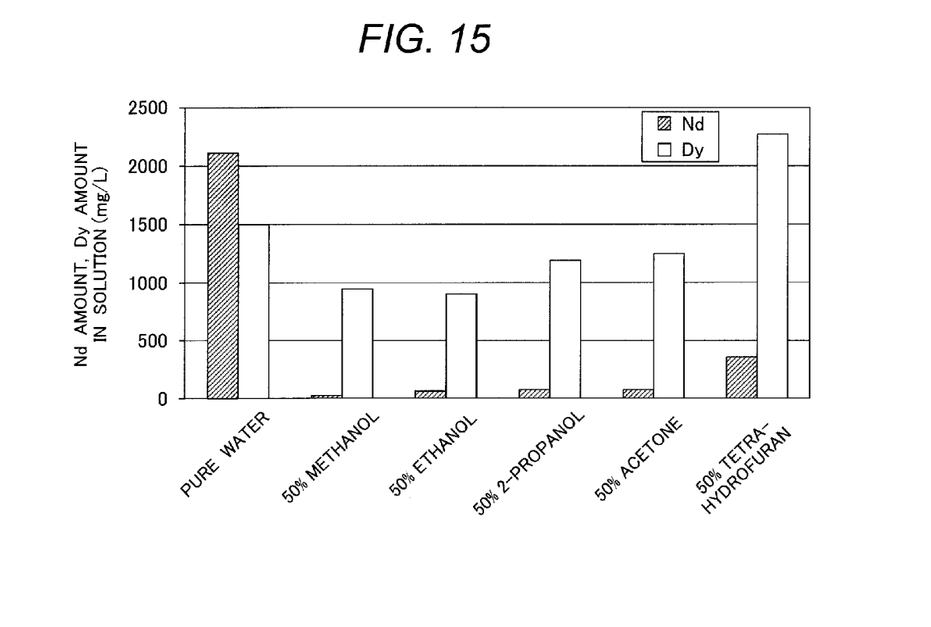
FIG. 15 is a diagram showing the amount of Nd and the amount of Dy in a solution when the kinds of the liquid were changed in Example 8.

FIG. 3 is a schematic view of a process for separating and recovering neodymium oxychloride (NdOCl) and dysprosium oxychloride (DyOCl) by utilizing the difference of solubility to the liquid. As shown in FIG. 3, when a mixture 40 of neodymium oxychloride (NdOCl) and dysprosium oxychloride (DyOCl) is introduced into a liquid 50, neodymium oxychloride (NdOCl) and dysprosium oxychloride (DyOCl) are dissolved into the liquid 50, but the solubility of them is different from each other. Due to the difference of the solubility between them, the amount of Dy and the amount of Nd in the liquid 50 are different. For example, as shown in FIG. 15 to be described later, when the liquid 50 is a liquid mixture in which an organic solvent is mixed by 50% in pure water, the amount of Dy is extremely larger than the amount of Nd in the liquid 50. That is, in this case, dysprosium oxychloride (DyOCl) is dissolved in a great amount in the liquid 50, whereas the neodymium oxychloride (NdOCl) is not dissolved so much (insoluble matter 60). Thus, neodymium oxychloride (NdOCl) and dysprosium oxychloride (DyOCl) can be separated and recovered from the mixture of neodymium oxychloride (NdOCl) and dysprosium oxychloride (DyOCl) by utilizing the difference of the solubility to the liquid.

(2) Separation of Rare Earth Elements and Other Elements from Rare-Earth Composition A method is to be described for separating rare-earth elements and other elements from a rare-earth magnet (NdFeB magnet) containing neodymium (Nd), dysprosium (Dy), iron (Fe), and boron (B) as main ingredients. As the starting material (rare earth composition) used for separation, rare-earth magnet wastes, such as disused products or failed products, or fabrication wastes (sludges), such as cutting wastes formed upon manufacture of magnets, are used preferably. With a view point of easy chemical reaction, the starting material is preferably in a powdered state. The followings show an example of separation from powder of sludges.

The method of separating rare-earth elements and other elements includes the following examples, but they are not limitative. A first method is a method of heating and oxidizing sludges, adding water to form a slurry, adjusting pH of the slurry by adding an acid or alkali to the slurry, and precipitating other ingredients than the rare-earth elements as hydroxides. A second method is a method of dissolving a powder of sludges with sulfuric acid or the like and then separating other ingredients than the rare-earth elements by an oxalic acid precipitation method. A third method is a method of heating a sludge powder in a chlorine atmosphere to form a chloride mixture and then heating the mixture while reducing the pressure, thereby separating rare-earth elements and other elements by utilizing the difference of vapor pressure between each of chlorides (rare-earth chloride, iron chloride, etc.). A fourth method is a method of introducing a sludge powder into a molten salt of magnesium chloride or zinc iodide and chlorinating or iodizing and immersing the rare-earth elements, thereby separating iron, boron, etc.

The rare-earth elements are recovered in the forms of rare-earth oxides, rare-earth oxalates, rare-earth carbonates, rare-earth iodides, rare-earth chlorides, and rare-earth sulfates, for example, by the separation methods described above. Desired rare-earth chlorides and rare-earth oxychlorides can be obtained by using them as starting materials and applying a heat treatment with adjusting a chlorine partial pressure and an oxygen partial pressure in a chlorine atmosphere. In the examples described above, neodymium chloride ($NdCl_3$) and dysprosium oxychloride (DyOCl) can be obtained by subjecting the starting material to a heat treatment in a chlorine atmosphere with adjusting the chlorine partial pressure and the oxygen partial pressure to the points A shown in FIG. 1A and FIG. 1B. Neodymium oxychloride (NdOCl) and dysprosium oxychloride (DyOCl) can be obtained by subjecting the starting material to a heat treatment in a chlorine atmosphere with adjusting the chlorine partial pressure and the oxygen partial pressure to regions shown in FIG. 1A and FIG. 1B where neodymium oxychloride (NdOCl) and dysprosium oxychloride (DyOCl) are stable.

(3) Separation of Dy, Nd

When a mixture of neodymium chloride ($NdCl_3$) and dysprosium oxychloride (DyOCl) is introduced into a liquid, neodymium chloride ($NdCl_3$) and dysprosium oxychloride (DyOCl) can be separated and recovered since neodymium chloride ($NdCl_3$) is dissolved into the liquid and the dysprosium oxychloride (DyOCl) is not dissolved into the liquid to form an insoluble matter as shown in FIG. 2. Further, when a mixture of neodymium oxychloride (NdOCl) and dysprosium oxychloride (DyOCl) is introduced into a liquid, Nd and Dy can be separated by utilizing the difference of the solubility to the liquid between neodymium oxychloride (NdOCl) and dysprosium oxychloride (DyOCl). As the liquid, pure water, a solution formed by mixing an organic solvent to pure water, and an organic solvent can be used. Alcohols are preferably used as the organic solvent, methanol or ethanol among the alcohols being particularly preferably used. Such organic solvents have less volatility and cause less effect on global environments compared with organic solvents used in the methods disclosed in Documents 1 and 2, for example.

Dy and Nd are separated, as described above, by introducing a mixture of neodymium chloride ($NdCl_3$) and dysprosium oxychloride (DyOCl) into the liquid or by introducing a mixture of neodymium oxychloride (NdOCl) and dysprosium oxychloride (DyOCl) into the liquid. The liquid is preferably stirred depending on the amount of the liquid or the amount of the mixture to be introduced into the liquid. For stirring, a stirrer, a stirring blade, ultrasonic vibrations, etc. can be used. Further, stirring is preferably performed under sealing for preventing the liquid from evaporization. Leaching to the liquid can be promoted by heating during stirring. However, the temperature during stirring is preferably at or lower than the boiling point of the liquid since the amount of the liquid decreases when the heating temperature is higher than the boiling point of the liquid.

The ratio of Dy contained in the insoluble matter which is not dissolved in the liquid is referred to as a Dy separation rate in the method for separating and recovering Nd and Dy from a mixture of neodymium chloride ($NdCl_3$) and dysprosium oxychloride (DyOCl). Further, the ratio of Dy contained in the liquid (solution) is referred to as a Dy separation rate in the method for separating and recovering Nd and Dy from a mixture of neodymium oxychloride (NdOCl) and dysprosium oxychloride (DyOCl). These Dy separation rates are represented by $M_D/(M_N+M_D) \times 100$ where $M_D$ represents mass of Dy and $M_N$ represents mass of Nd. When the Dy separation rate is high, Dy can be separated efficiently. The Dy separation rate is preferably 90% or higher, more preferably 95%, in a single separation.

(4) Recovery of Dy, Nd

In the method for separating and recovering Nd and Dy from the mixture of neodymium chloride ($NdCl_3$) and dysprosium oxychloride (DyOCl) as described above, when the mixture of neodymium chloride ($NdCl_3$) and dysprosium oxychloride (DyOCl) is introduced into the liquid, a solution in which the neodymium chloride is dissolved is obtained and, at the same time, dysprosium oxychloride is obtained as a solid insoluble matter. The insoluble matter sometimes includes, in addition to dysprosium oxychloride, other ingredients as impurities. The solution in which neodymium chloride is dissolved and the insoluble matter containing dysprosium oxychloride can be separated by a common method, such as filtration or centrifugation.

For the neodymium chloride solution, Nd can be recovered as a powder of neodymium oxychloride by spraying the solution in a heated atmosphere using a spray drier. Alternatively, a hardly soluble neodymium salt is formed by adjusting pH of the neodymium chloride solution and then adding a precipitation material thereto. Nd can be recovered as neodymium oxide by filtering and drying the insoluble matter and then by sintering the insoluble matter at about 900° C. in the atmospheric air. Examples of the precipitation material include ammonium carbonate (($NH_4)_2CO_3$), ammonium hydrogen carbonate ($NH_4HCO_3$), sodium carbonate ($Na_2CO_3$), sodium hydrogen carbonate ($NaHCO_3$), oxalic acid (($COOH)_2$), sodium oxalate (($COONa)_2$), and ammonium hydroxide ($NH_2OH$).

For the dysprosium oxychloride obtained as the solid insoluble matter, Dy can be recovered as dysprosium oxychloride by drying the dysprosium oxychloride. Alternatively, hardly soluble dysprosium salt is formed by dissolving dysprosium oxychloride with an acid (hydrochloric acid or nitric acid, for example) to obtain a hydrate and then adjusting pH of the hydrate and adding a precipitation material thereto.

As described above, in the method for separating and recovering Nd and Dy from the mixture of neodymium oxychloride (NdOCl) and dysprosium oxychloride (DyOCl), when the mixture of neodymium oxychloride (NdOCl) and dysprosium oxychloride (DyOCl) is introduced into a liquid, a solution in which the mixture is dissolved is obtained. In neodymium oxychloride (NdOCl) and dysprosium oxychloride (DyOCl), those not dissolved in the liquid are precipitated as a solid insoluble matter. The solution and solid insoluble matter can be separated by a common method, such as filtration or centrifugation.

Here, a case is to be described for example of using a liquid mixture formed by mixing an organic solvent by 50% to pure water as the liquid, that is, a case where the solution mainly contains Dy and the insoluble matter mainly contains Nd.

Even in a case of using pure water as the liquid in which the solution mainly contains Nd and the insoluble matter mainly contains Dy, Nd can be recovered from the solution and Dy can be recovered from the insoluble matter in the same manner as the method to be described later.

For the solution mainly containing Dy, Dy can be recovered as a powder of dysprosium oxychloride by spraying the solution in a heated atmosphere using a spray drier. Alternatively, an insoluble matter of a hardly soluble dysprosium salt is formed by adjusting pH of the solution mainly containing Dy and then adding a precipitation material thereto.

An oxychloride containing Nd can be recovered from the solid insoluble matter by drying the solid insoluble matter.

Dy can be recovered as dysprosium oxide and Nd can be recovered as neodymium oxide by filtering and drying the insoluble matter formed by the two methods described above, and then by sintering the insoluble matter at about 900° C. in the atmospheric air. Examples of the precipitation material include ammonium carbonate (($NH_4)_2CO_3$), ammonium hydrogen carbonate ($NH_4HCO_3$), sodium carbonate ($Na_2CO_3$), sodium hydrogen carbonate ($NaHCO_3$), oxalic acid (($COOH)_2$), sodium oxalate (($COONa)_2$), and ammonium hydroxide ($NH_4OH$).

Specific examples of the present invention are to be described below. At first, examples of a method for separating and recovering Nd and Dy from a mixture of neodymium chloride ($NdCl_3$) and dysprosium oxychloride (DyOCl) are to be described in Examples 1 to 5. Then, examples of a method for separating and recovering Nd and Dy from a mixture of neodymium oxychloride (NdOCl) and dysprosium oxychloride (DyOCl) are to be described in Examples 6 to 9.

Example 1

In this example, neodymium chloride ($NdCl_3$) was used as a rare earth chloride and dysprosium oxychloride (DyOCl) was used as a rare-earth oxychloride. A dissolution test was performed for these samples to determine the amount of Dy contained in the liquid and a Dy separation rate of an insoluble matter ($=M_D/(M_N+M_D) \times 100$ where $M_D$ represents mass of Dy and $M_N$ represents mass of Nd). A method of preparing the samples and a method of the dissolution test are to be described below.

A neodymium chloride powder at 3N purity manufactured by Kojundo Chemical Laboratory Co., Ltd. was used for the sample of neodymium chloride ($NdCl_3$). The sample of dysprosium oxychloride (DyOCl) was prepared by the following method. Dysprosium oxide at 3N purity and dysprosium chloride at 3N purity manufactured by Kojundo Chemical Laboratory Co., Ltd. were weighed and mixed in a globe box under an Ar gas atmosphere at an atmospheric pressure, and hermetically confined in a reactor made of stainless steel. The reactor was placed in an electric furnace and a heat treatment was applied with adjusting the oxygen partial pressure and the chlorine partial pressure to the points A in the chemical potential diagrams shown in FIG. 1A and FIG. 1B. A heating temperature was 800° C. and a retention time was 6 hours. The powder was recovered from the reactor after the heat treatment. An X-ray diffraction test was performed on the obtained powder to find that the crystalline phase of the powder only consisted of DyOCl.

The dissolution test was performed as described below. The thus formed neodymium chloride ($NdCl_3$) and dysprosium oxychloride (DyOCl) were introduced each by 0.25 g (0.5 g in total) into a glass vessel (60 cc), 50 cc of a liquid was mixed to them, and they were stirred by a stirrer for 20 hours. In this example, a dissolution test using pure water as a liquid and a dissolution test using ethanol as the liquid were performed. A liquid temperature was 25° C. and a stirring speed was 500 rpm. The liquid and the insoluble matter after stirring were analyzed by high-frequency inductively coupled plasma atomic emission spectrometry (ICP-AES) to quantitatively analyze the amount of Dy and the amount of Nd.

Figure 4:
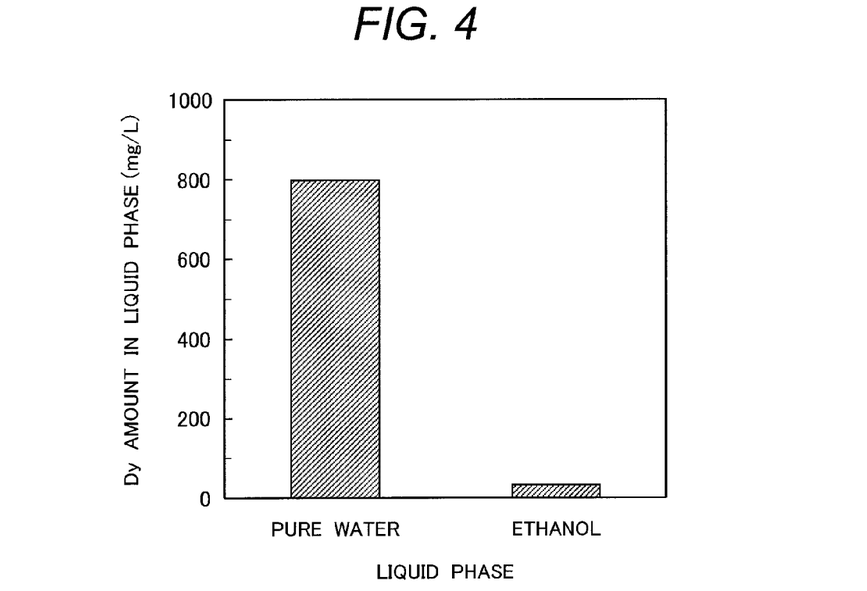
FIG. 4 is a diagram showing the amount of Dy contained in liquids in Example 1.

FIG. 4 shows the amount of Dy contained in each of the liquids. When the liquid was pure water, Dy was contained by 800 mg/L. When the liquid was ethanol, Dy was contained by 32 mg/L. Accordingly, when the liquid was ethanol, leaching of DyOCl into the liquid was suppressed compared with a case where the liquid was pure water. That is, it can be seen that the amount of DyOCl recovered as the insoluble matter increased when the liquid was ethanol.

Figure 5:
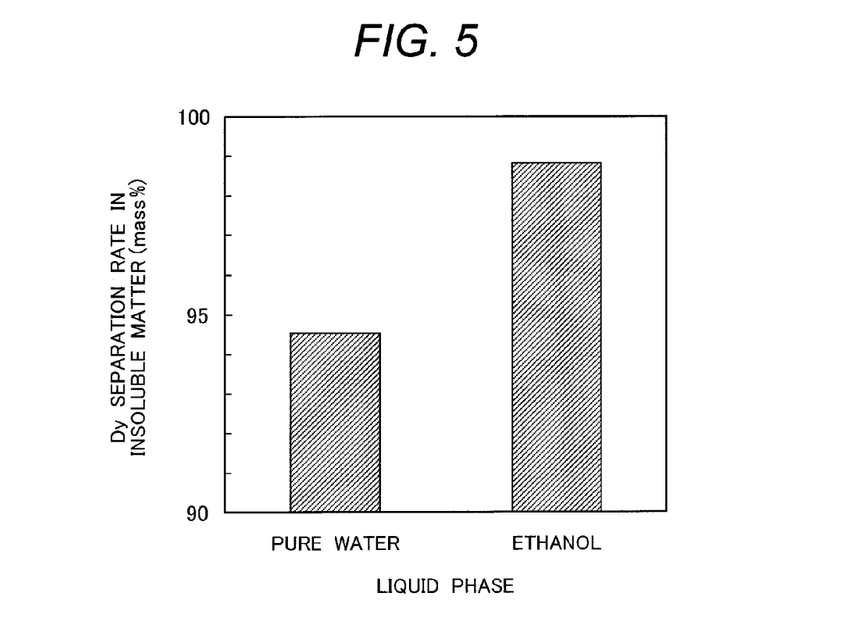
FIG. 5 is a diagram showing Dy separation rates of an insoluble matter in Example 1.

FIG. 5 shows Dy separation rates of the insoluble matter $(=M_D/(M_N+M_D) \times 100$ where $M_D$ represents mass of Dy and $M_N$ represents mass of Nd). When the liquid was pure water, the Dy separation rate was about 94.5 mass %. When the liquid is ethanol, the Dy separation rate was 98.8 mass %. Accordingly, when the liquid was ethanol, it can be seen that the Dy separation rate increased compared with a case where the liquid was pure water.

In view of the above results, it can be seen that DyOCl was not dissolved but tended to be precipitated in the liquid and the Dy separation rate of the insoluble matter was high in a case where the liquid was ethanol compared with a case where the liquid was pure water.

Example 2

Figure 6:
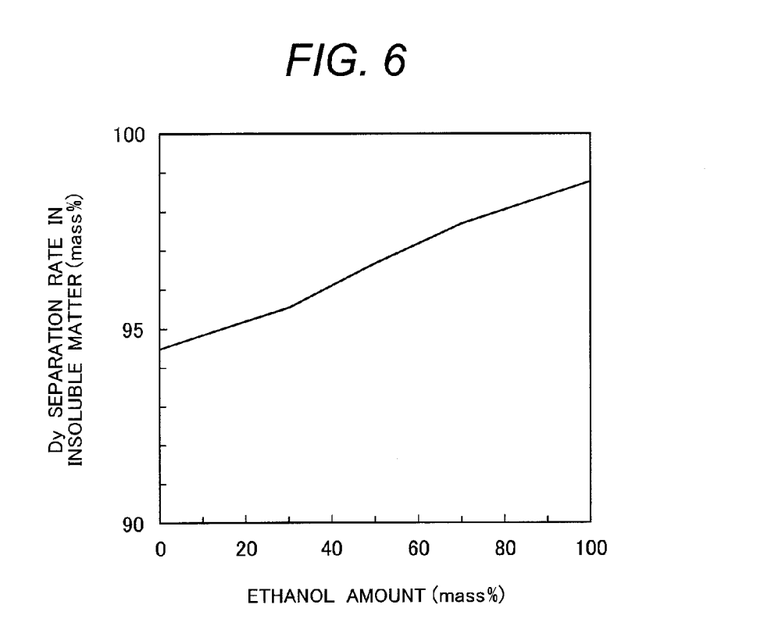
FIG. 6 is a diagram showing a relationship between the amount of ethanol in a liquid and a Dy separation rate of an insoluble matter in Example 2.

FIG. 6 is a graph showing a relationship between the amount of ethanol in the liquid and the Dy separation rate of an insoluble matter $(=M_D/(M_N+M_D) \times 100$ where $M_D$ represents mass of Dy and $M_N$ represents mass of Nd) in a case where the liquid was formed by mixing ethanol with pure water. FIG. 6 shows a fitted curve of the obtained data. The amount of ethanol is represented by the ratio of ethanol in the liquid. A method of preparing the samples and a method of the dissolution test are identical with those in Example 1.

As shown in FIG. 6, the Dy separation rate tended to increase along with increase in the amount of ethanol in the liquid. In view of the above result, it can be seen that the Dy separation rate of the insoluble matter was higher as the amount of ethanol increased in the solution in which pure water and ethanol are mixed.

Example 3

In this example, a dissolution test was performed with changing the mixing ratio of neodymium chloride ($NdCl_3$) and dysprosium oxychloride (DyOCl) which were samples. A method of preparing the samples and a method of the dissolution test were identical with those in Example 1, except that the mixing ratio of the neodymium chloride and dysprosium oxychloride was different.

Figure 7:
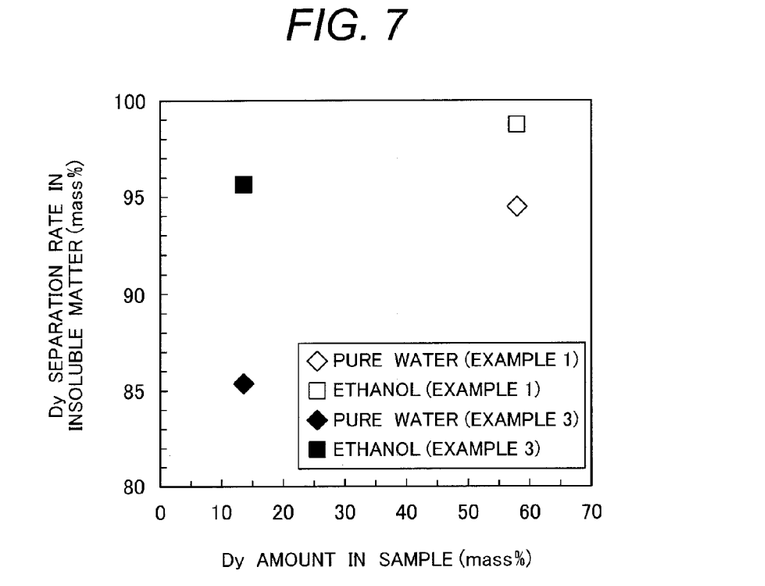
FIG. 7 is a diagram showing a Dy separation rate of an insoluble matter when the mixing ratio of neodymium chloride and dysprosium oxychloride was changed in Example 3.

FIG. 7 is a diagram showing a Dy separation rate of an insoluble matter $(=M_D/(M_N+M_D) \times 100$ where $M_D$ represents mass of Dy and $M_N$ represents mass of Nd) when the mixing ratio of neodymium chloride and dysprosium oxychloride was changed. FIG. 7 shows Dy separation rates in a case where the liquid was pure water (i.e. the amount of ethanol was 0 mass %.) and a case where the liquid was ethanol (i.e. the amount of ethanol was 100 mass %.). Further, for comparison with this example, the Dy separation rate in Example 1 was also shown for the case where the liquid was pure water and the case where the liquid was ethanol. In this example, the mixing ratio of dysprosium oxychloride was less than that in Example 1. The abscissa in FIG. 7 represents the amount of Dy in the sample (Dy ratio in the sample). The amount of Dy was 13.3 mass % in this example and 57.6 mass % in Example 1.

In this example in which the amount of Dy in the sample was decreased, the Dy separation rate of the insoluble matter lowered compared with Example 1 as shown in FIG. 7. In a case where the liquid was pure water, the Dy separation rate greatly lowered from 94.5 mass % to 85.4 mass %. On the other hand, when the liquid was ethanol, the Dy separation rate less lowered as from 98.8 mass % to 95.7 mass %. In a case where the liquid was ethanol, no remarkable reduction in the Dy separation rate was observed as in the case where the liquid was pure water.

In view of the above result, in a case where the liquid was ethanol, reduction in the Dy separation rate was small to exhibit a high Dy separation rate even when the amount of Dy in the mixture of neodymium chloride and dysprosium oxychloride was small, compared with a case where the liquid was pure water.

Example 4

In this example, a dissolution test was performed with changing the kinds of a liquid. A method of preparing the samples and a method of the dissolution test were identical with those in Example 1, except that the kinds of the liquids were different from Example 1. The kinds of the liquid used in this example were pure water, ethanol, methanol, 2-propanol, acetone, and tetrahydrofuran.

Figure 8:
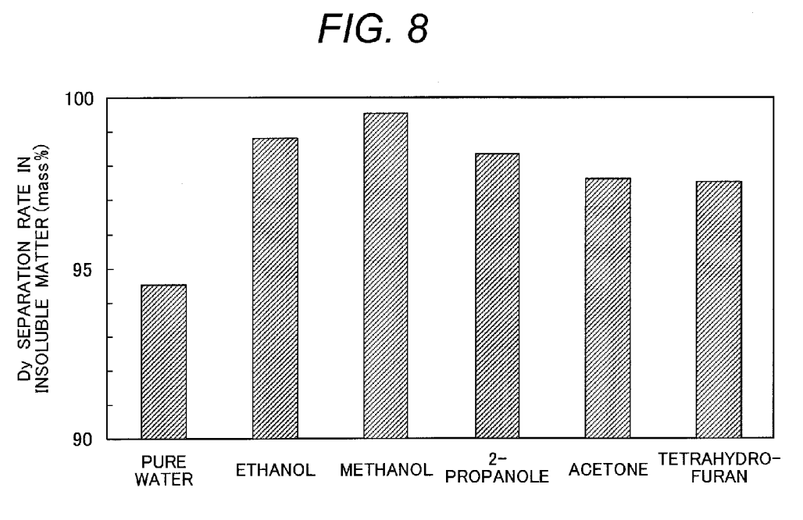
FIG. 8 is a diagram showing a Dy separation rate of an insoluble matter when the kinds of a liquid were changed in Example 4.

FIG. 8 is a diagram showing a Dy separation rate of an insoluble matter $(=M_D/(M_N+M_D) \times 100$ where $M_D$ represents mass of Dy and $M_N$ represents mass of Nd) when the kinds of the liquid were changed. As shown in FIG. 8, the Dy separation rate was 94.5 mass % in a case where the liquid was pure water. On the other hand, the Dy separation rate exceeded 97 mass % in each of the cases where the liquid was an organic solvent of ethanol, methanol, 2-propanol, acetone, or tetrahydrofuran.

In view of the above result, it has been found that the Dy separation rate was higher in a case where the liquid was an organic solvent compared with a case where the liquid was pure water.

Example 5

In this example, sludges of rare-earth magnets were used as the rare-earth composition and rare-earth elements were separated and recovered from the sludges. The rare-earth magnets used in this example were NdFeB magnets containing neodymium (Nd) and dysprosium (Dy), for example. The sludges used in this example contained 61.2 mass % iron (Fe), 23.1 mass % Nd, 3.5 mass % Dy, 2.0 mass % praseodymium (Pr), and 1.0 mass % boron (B).

After dissolving the powder of the sludges with sulfuric acid, rare-earth elements were precipitated by oxalic acid to remove ingredients other than the rare-earth elements (oxalic acid precipitation method). Then, oxalates obtained by the oxalic acid precipitation method were heat-treated to form rare-earth oxide mixtures. The obtained rare-earth oxide mixtures were heat-treated at 800° C. with adjusting the oxygen partial pressure and the chlorine partial pressure to the points A in the chemical potential diagrams shown in FIG. 1A and FIG. 1B, obtaining neodymium chloride ($NdCl_3$) and dysprosium oxychloride (DyOCl).

50 g of the obtained mixture of neodymium chloride and dysprosium oxychloride was introduced into ethanol (about 5

L) and stirred by a stirring blade for 20 hours. A liquid temperature was about 25° C. and a stirring speed was 200 rpm. After drying an insoluble matter after stirring at 110° C. for 12 hours, the amount of Dy and the amount of Nd were quantitatively analyzed by high-frequency inductively coupled plasma atomic emission spectrometry (ICP-AES). The Dy separation rate of the insoluble matter (=$M_D/(M_N+M_D)\times100$ where $M_D$ represents mass of Dy and $M_N$ represents mass of Nd) was calculated to be 98.5% from the obtained amounts of Dy and Nd. As described above, a high Dy separation rate exceeding 95% was obtained in this example.

The insoluble matter may be further subjected to a treatment to be stirred in ethanol under the same conditions. Since impurities may possibly be mixed in the insoluble matter, the impurities can be further removed by this treatment. In this example, a treatment of stirring the insoluble matter in ethanol under the same conditions was applied again and the Dy separation rate was calculated. As a result, the Dy separation rate was 99.8% and an extremely high rate was obtained.

As described above, Dy was separated from the rare-earth composition at a Dy separation rate as high as 90% or more by a single separation. Nd could be recovered from the liquid (ethanol solution of neodymium chloride) as described in "(4) Recovery of Dy, Nd". In this example, the Nd separation rate was necessarily higher since the Dy separation rate of the insoluble matter was high, that is, the amount of Dy contained in the liquid was small.

Example 6

In this example, neodymium oxychloride (NdOCl) and dysprosium oxychloride (DyOCl) were used as a rare-earth oxychloride. A dissolution test was performed for the samples to determine the amount of Nd and the amount of Dy contained in the solution and the Dy separation rate of the solution (=$M_D/(M_N+M_D)\times100$ where $M_D$ represents mass of Dy and $M_N$ represents mass of Nd). A method of preparing the samples and a method of the dissolution test are to be described below.

As samples, neodymium oxide at 3N purity and neodymium chloride at 3N purity manufactured by Kojundo Chemical Laboratory Co., Ltd. were used for neodymium oxychloride (NdOCl), and dysprosium oxide at 3N purity and dysprosium chloride at 3N purity were used for dysprosium oxychloride (DyOCl), and the samples were manufactured by the following method. Each of a powder mixture of neodymium oxide and neodymium chloride and a powder mixture of dysprosium oxide and dysprosium chloride was weighed and mixed in a globe box under an Ar gas atmosphere at an atmospheric pressure, and the mixtures were hermetically confined in stainless steel reactors, respectively. The reactors were placed in an electric furnace and subjected to a heat treatment under the condition of forming NdOCl and DyOCl in the chemical potential diagrams shown in FIG. 1A and FIG. 1B (oxygen partial pressure and chlorine partial pressure in regions where the NdOCl and DyOCl are stable), respectively. A heating temperature was 800° C. and the retention time was 6 hours. The powders were recovered from the reactors after the heat treatment. An X-ray diffraction test was performed on the two kinds of the obtained powders to examine the crystalline phase of the powders.

Figure 9:
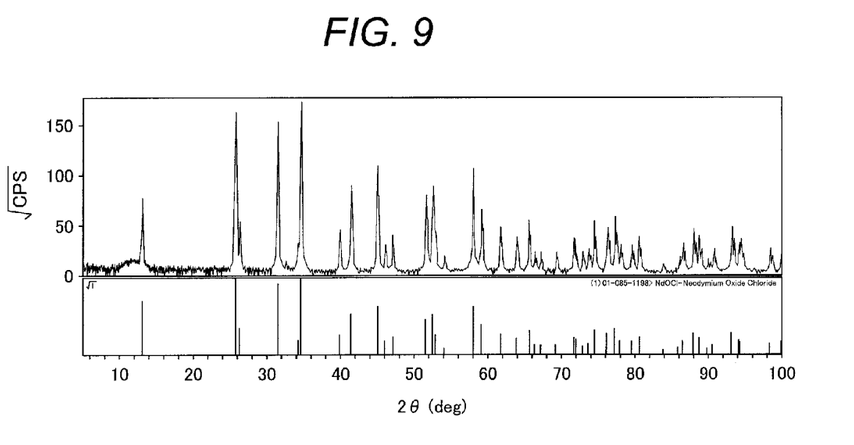
FIG. 9 shows an X-ray diffraction pattern of a powder obtained by a heat treatment of a powder mixture of neodymium oxide and neodymium chloride in Example 6.
Figure 10:
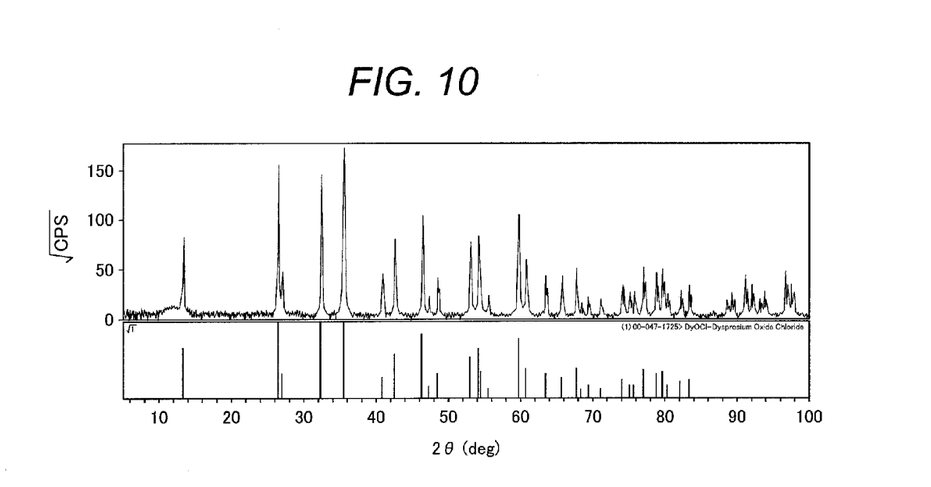
FIG. 10 shows an X-ray diffraction pattern of a powder obtained by a heat treatment of a powder mixture of dysprosium oxide and dysprosium chloride in Example 6.

FIG. 9 and FIG. 10 show X-ray diffraction patterns of the powders as a result of the X-ray diffraction test for the powders obtained by the heat treatment. FIG. 9 is an X-ray diffraction pattern of the powder obtained by heat-treating the powder mixture of neodymium oxide and neodymium chloride. FIG. 10 is an X-ray diffraction pattern of the powder obtained by heat-treating the powder mixture of dysprosium oxide and dysprosium chloride. An X-ray diffraction pattern of NdOCl according to ICDD (International Centre for Diffraction Data) as a standard data collection of powder X-ray diffraction is additionally shown in FIG. 9 and an X-ray diffraction pattern of DyOCl according to ICDD is additionally shown in FIG. 10 below the X-ray diffraction patterns obtained by the X-ray diffraction test, respectively.

As shown in FIG. 9, only NdOCl was formed from the powder mixture of neodymium oxide and neodymium chloride. As shown in FIG. 10, only DyOCl was formed from the powder mixture of dysprosium oxide and dysprosium chloride.

Each of these oxychlorides was introduced into a liquid and a dissolution test was performed for each of them to evaluate the solubility of them in the liquid. The evaluation method was as described below. The formed oxychlorides (NdOCl and DyOCl) were introduced each by 0.25 g (0.5 g in total) into a glass vessel (60 cc) and 50 cc of a liquid was mixed. A rotor placed in the glass vessel was rotated to stir by a stirrer at a speed of 500 rpm for 20 hours. After filtering the solution after stirring by using filter paper (particle-retention capability of 2.5 µm) and a syringe filter (pore diameter of 0.2 µm), the filtrate (hereinafter referred to as a solution) was analyzed by high-frequency inductively coupled plasma atomic emission spectrometry (ICP-AES) to quantitatively analyze the amount of Dy and the amount of Nd dissolved in the liquid. In this example, a dissolution test in a case of using pure water for the liquid and a dissolution test in a case of using a liquid mixture of pure water and ethanol for the liquid were performed.

Figure 11:
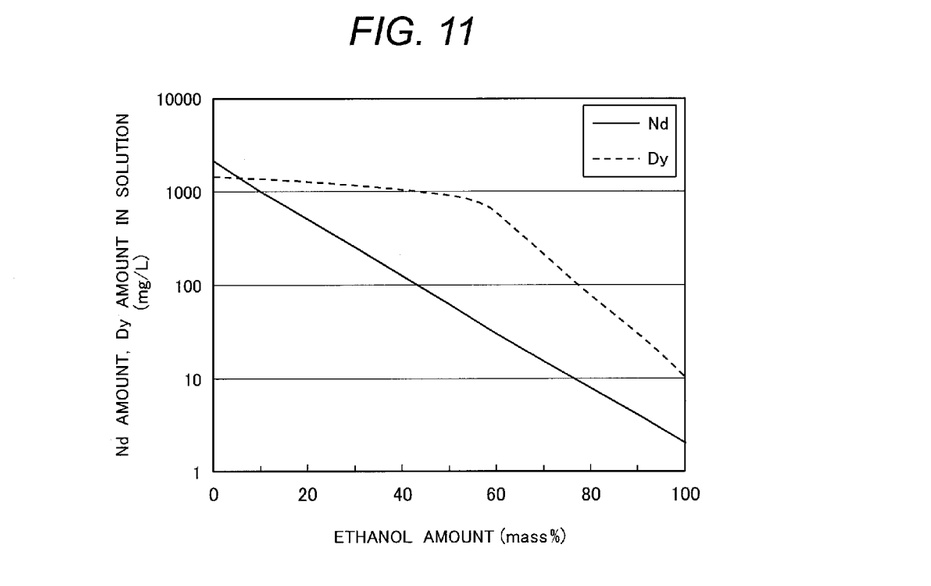
FIG. 11 is a graph showing the amount of Nd and the amount of Dy in a solution when the amount of ethanol in a liquid was changed in Example 6.

FIG. 11 is a graph showing the amount of Nd and the amount of Dy in the solution in a case of changing the amount of ethanol in the liquid. FIG. 11 shows fitted curves of the obtained data. The amount of ethanol is represented by the ratio of ethanol in the liquid. When the amount of ethanol was 100 mass %, the liquid consisted only of ethanol. When the amount of ethanol was 0 mass %, the liquid consisted of pure water. The amount of Nd decreased along with increase in the amount of ethanol. When the liquid consisted only of ethanol, the amount of Nd decreased as low as about 1/1000 compared with a case where the liquid was pure water. The amount of Dy decreased slowly along with increase in the amount of ethanol until the amount of ethanol reached about 60 mass %. However, the amount of Dy decreased remarkably when the amount of ethanol exceeded about 60 mass %. When the liquid consisted only of ethanol, the amount of Dy was a value of about 1/150 compared with a case where the liquid was pure water.

As shown in FIG. 11, a dissolution behavior to the amount of ethanol was different between NdOCl and DyOCl. A Dy separation rate in the solution (=$M_D/(M_N+M_D)\times100$ where $M_D$ represents mass of Dy and $M_N$ represents mass of Nd) was calculated from the amount of Nd and the amount of Dy in the solution shown in FIG. 11.

Figure 12:
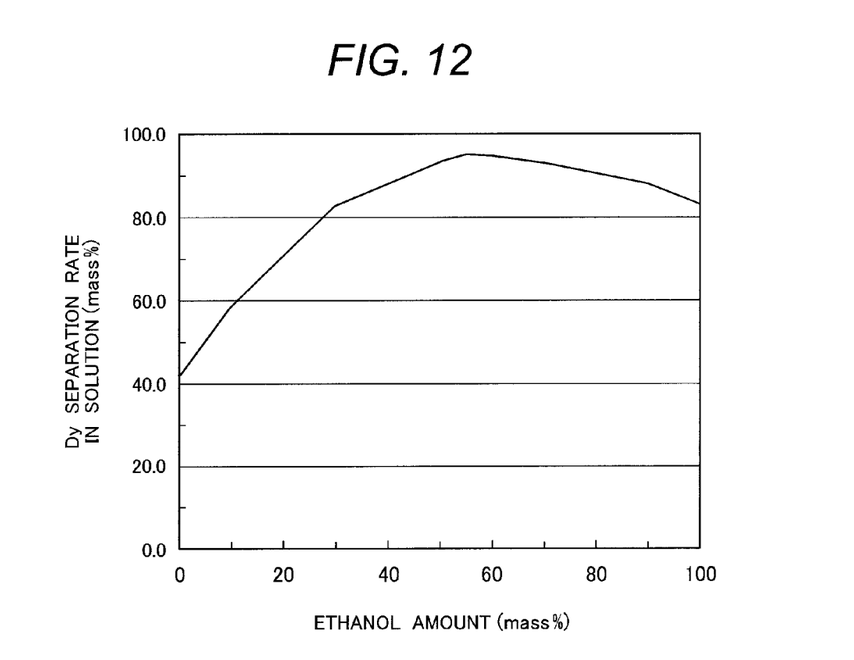
FIG. 12 is a graph showing a Dy separation rate of a solution when the amount of ethanol in the liquid was changed in Example 6.

FIG. 12 is a graph showing a Dy separation rate calculated from the amount of Nd and the amount of Dy in the solution. As shown in FIG. 12, the Dy separation rate increased along with increase in the amount of ethanol and showed a maximum value near the amount of ethanol at 60%. Further, the Dy separation rate showed 80% or more when the amount of ethanol was 30% or more and, particularly, showed a value of 90% or more in a range of the amount of ethanol from 50% to 80%.

In view of the above results, it has been found that the Dy separation rate showed a value of 90% or more when the amount of ethanol in the liquid (ratio of ethanol and pure water in the liquid) was in a range from 50% to 80%.

Example 7

In this example, a dissolution test was performed with changing the particle diameters of neodymium oxychloride (NdOCl) and dysprosium oxychloride (DyOCl) as samples. A method of preparing the samples and a method of the dissolution test were identical with those in Example 6, except that the particle diameters of NdOCl and DyOCl was changed by changing heat treatment conditions. A liquid mixture formed by mixing 50% of ethanol with pure water was used as the liquid.

Figure 13:
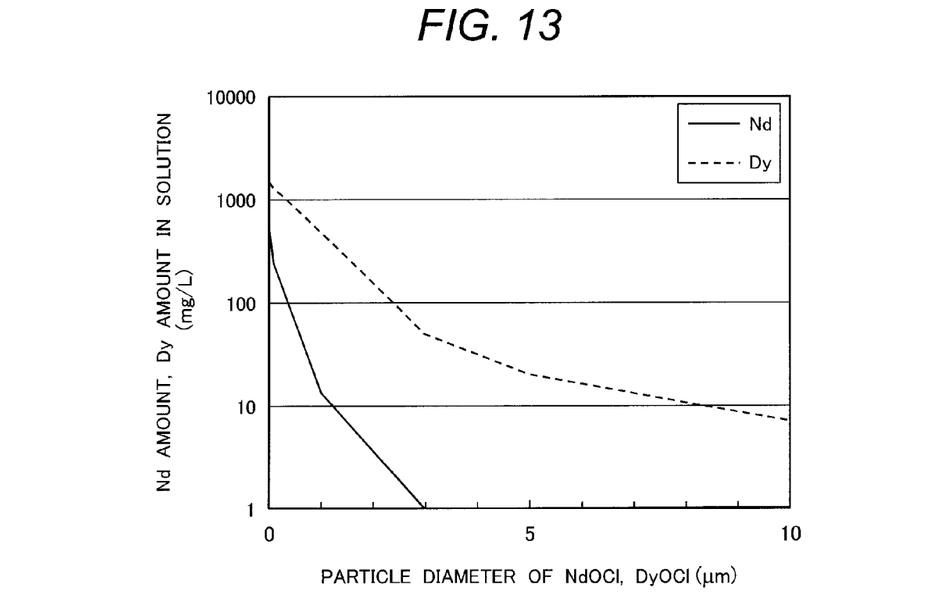
FIG. 13 is a graph showing a relationship between a particle diameter of NdOCl and the amount of Nd in a solution and a relationship between a particle diameter of DyOCl and the amount of Dy in the solution.

FIG. 13 is a graph showing a relationship between the particle diameter of NdOCl and the amount of Nd in the solution and a relationship between the particle diameter of DyOCl and the amount of Dy in the solution. FIG. 13 represents fitted curves of the obtained data. As shown in FIG. 13, the amount of Nd and the amount of Dy in the solution tended to decrease for NdOCl and DyOCl, respectively, as the particle diameters increased. However, the leaching behavior was different between NdOCl and DyOCl. In the case of NdOCl, at a particle diameter of 3 µm or larger, the amount of Nd in the solution was below the detection limit in the high-frequency inductively coupled plasma atomic emission spectrometry (ICP-AES). On the other hand, in the case of DyOCl, Dy was detected from the solution even at the particle diameter of 10 µm.

Figure 14:
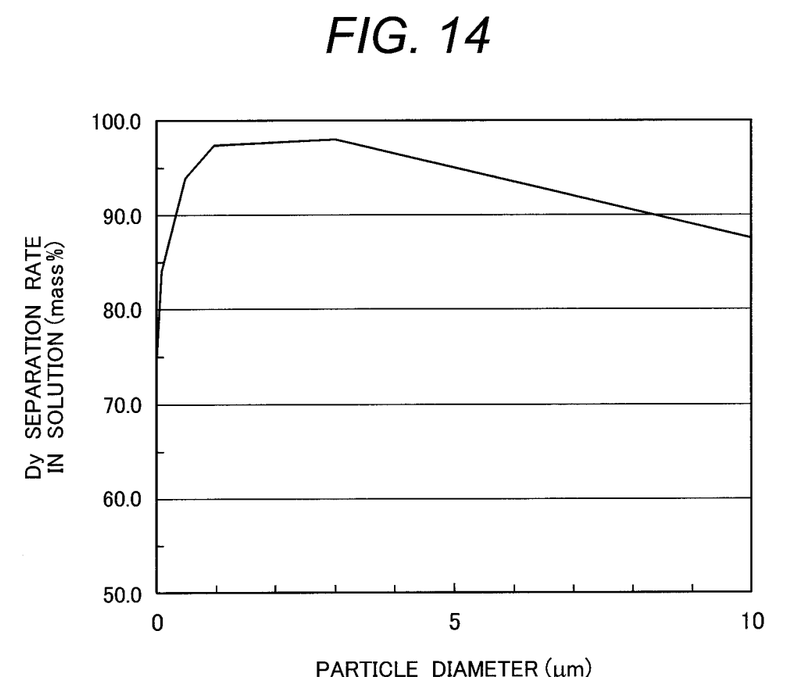
FIG. 14 is a graph showing a Dy separation rate of a solution when the particle diameters of NdOCl and DyOCl were changed in Example 7.

FIG. 14 is a graph showing a Dy separation rate ($=M_D/(M_N+M_D) \times 100$ where $M_D$ represents mass of Dy and $M_N$ represents mass of Nd) calculated from the amount of Nd and the amount of Dy in the solution in a case where the particle diameters of NdOCl and DyOCl were changed. In FIG. 14, the detection limit value in ICP-AES was used as the amount of Nd in the solution at the particle diameter of 3 µm or more.

As shown in FIG. 14, the Dy separation rate was 90% or more in a range of the particle diameter from about 0.5 µm to 8 µm. Particularly, the Dy separation rate showed a value as high as 95% or more within a range of the particle diameter from 1 µm to 5 µm.

In view of the above results, it has been found that the Dy separation rate shows a high value of 95% or more within a range of the particle diameters of NdOCl and DyOCl from 1 µm to 5 µm.

Example 8

In this example, a dissolution test was performed with changing the kinds of the liquid. A method of preparing the samples and a method of the dissolution test were identical with those in Example 6, except for the kinds of the liquid. The kinds of the liquid used in this example were pure water and a liquid mixture formed by mixing various kinds of organic solvents by 50% to pure water. As the organic solvents, methanol, ethanol, 2-propanol, acetone, and tetrahydrofuran were used.

FIG. 15 is a diagram showing the amount of Nd and the amount of Dy in the solution in a case where the kinds of the liquid were changed. As shown FIG. 15, when the liquid was pure water, the amount of Dy was less than the amount of Nd in the solution. However, in a case where the liquid was a liquid mixture of pure water and the organic solvent, the amount of Dy was more than the amount of Nd in the solution. Further, it has been found that when the liquid is a liquid mixture, the difference between the amount of Dy and the amount of Nd in the solution was large and the difference in solubility to the liquid between them was remarkable. Accordingly, it was expected that when the liquid was a liquid mixture of pure water and the organic solvent, the Dy separation rate of the solution was larger.

Figure 16:
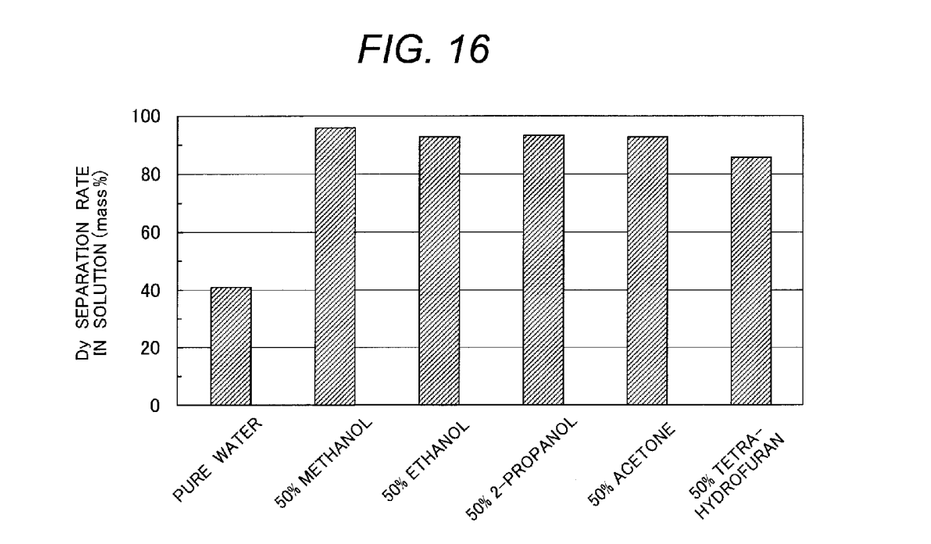
FIG. 16 is a diagram showing a Dy separation rate of a solution when the kinds of the liquid were changed in Example 8.

FIG. 16 is a diagram showing a Dy separation rate calculated from the amount of Nd and the amount of Dy in the solution ($=M_D/(M_N+M_D) \times 100$ where $M_D$ represents mass of Dy and $M_N$ represents mass of Nd) in a case where the kinds of the liquid were changed. As shown in FIG. 16, any of the liquid mixtures showed a higher Dy separation rate than pure water did. The Dy separation rate was 90% or higher in the liquid mixtures using methanol, ethanol, 2-propanol, or acetone as an organic solvent. Particularly, the Dy separation rate showed a high value of 95% or higher in a liquid mixture using methanol.

In view of the above results, it has been found that the Dy separation rate showed a value of 90% or higher when using a liquid mixture in which 50% of an organic solvent was mixed with pure water as a liquid.

Example 9

In this example, sludges of rare-earth magnets were used as the rare-earth composition and rare-earth elements were separated and recovered from the sludges. The rare-earth magnets used in this example were NdFeB magnets containing neodymium (Nd) and dysprosium (Dy), for example. The sludges used in this example contained 61.2 mass % iron (Fe), 23.1 mass % Nd, 3.5 mass % Dy, 2.0 mass % praseodymium (Pr), and 1.0 mass % boron (B).

After dissolving the powder of the sludges with sulfuric acid, rare-earth elements were precipitated by oxalic acid to remove ingredients other than the rare earth elements (oxalic acid precipitation method). Then, oxalates obtained by the oxalic acid precipitation method were heat-treated to form rare-earth oxide mixtures. The obtained rare-earth oxide mixtures were heat-treated at 800° C. with adjusting the oxygen partial pressure and the chlorine partial pressure in regions where neodymium oxychloride (NdOCl) and dysprosium oxychloride (DyOCl) were stable based on the chemical potential diagrams shown in FIG. 1A and FIG. 1B, obtaining neodymium oxychloride and dysprosium oxychloride.

50 g of the obtained mixture of neodymium oxychloride and dysprosium oxychloride was introduced into a liquid mixture (about 5 L) in which 50% of ethanol was mixed with pure water and stirred by a stirring blade for 20 hours. A liquid temperature was about 25° C. and a stirring speed was 200 rpm. The solution after the stirring was filtered by the same procedures as those in Example 6, and the amount of Nd and the amount of Dy were quantitatively analyzed by high-frequency inductively coupled plasma atomic emission spectrometry (ICP-AES). The Dy separation rate of the solution ($=M_D/(M_N+M_D) \times 100$ where $M_D$ represents mass of Dy and $M_N$ represents mass of Nd) was calculated to be 95.6% from the obtained amounts of Nd and of Dy. As described above, a high Dy separation rate exceeding 95% was obtained in this example.

As described above, Dy was separated from the rare-earth composition at a Dy separation rate as high as 90% or more by a single separation. Nd could be recovered from the solid insoluble matter as described in "(4) Recovery of Dy, Nd". In this example, the Nd separation rate was necessarily higher since the Dy separation rate of the solution was high, that is, the amount of Dy contained in the liquid was large.

In the examples described above, a case was described where two kinds of rare-earth elements were contained in the rare-earth composition. When three or more kinds of rare-earth elements are contained in the rare-earth composition, each of the rare-earth elements may be separated and recovered one by one by repeating the same separation and recovery method as described above. In this way, each of the rare-earth elements can be separated and recovered from a rare-earth composition containing plural kinds of rare-earth elements.

What is claimed is:

1. A method for separating and recovering a plurality of rare-earth elements, the method comprising the steps of:
introducing, into a liquid containing an organic solvent, a mixture containing a rare-earth oxychloride and a rare-earth chloride, the rare-earth oxychloride comprising a first rare-earth element, the rare-earth chloride comprising a second rare-earth element different from the first rare-earth element, thereby obtaining an insoluble matter containing the rare-earth oxychloride and a liquid in which the rare-earth chloride is dissolved;
recovering the rare-earth oxychloride from the insoluble matter; and
recovering the rare-earth chloride from the liquid in which the rare-earth chloride is dissolved.

2. The method for separating and recovering a plurality of rare-earth elements according to claim 1,
wherein the organic solvent is an alcohol.

3. The method for separating and recovering a plurality of rare-earth elements according to claim 1,
wherein the rare-earth oxychloride is an oxychloride containing dysprosium.

4. The method for separating and recovering a plurality of rare-earth elements according to claim 1,
wherein the rare-earth chloride is a chloride containing neodymium.

5. A method for separating and recovering a plurality of rare-earth elements, the method comprising the steps of:
introducing, into a liquid, a mixture containing a first rare-earth oxychloride and a second rare-earth oxychloride, the first rare-earth oxychloride comprising a first rare-earth element, the second rare-earth oxychloride comprising a second rare-earth element different from the first rare-earth element, thereby obtaining a liquid in which the first rare-earth oxychloride is dissolved;
recovering the first rare-earth oxychloride from the liquid in which the first rare-earth oxychloride is dissolved; and
recovering the second rare-earth oxychloride from an insoluble matter which is not dissolved in the liquid.

6. The method for separating and recovering a plurality of rare-earth elements according to claim 5,
wherein the first rare-earth oxychloride is an oxychloride containing dysprosium.

7. The method for separating and recovering a plurality of rare-earth elements according to claim 5,
wherein the second rare-earth oxychloride is an oxychloride containing neodymium.

8. A method for separating and recovering a plurality of rare-earth elements, the method comprising the steps of:
introducing, into a liquid containing an organic solvent, a mixture containing a first rare-earth oxychloride and a second rare-earth oxychloride, the first rare-earth oxychloride comprising a first rare-earth element, the second rare-earth oxychloride comprising a second rare-earth element different from the first rare-earth element, thereby obtaining a liquid in which the first rare-earth oxychloride is dissolved;
recovering the first rare-earth oxychloride from the liquid in which the first rare-earth oxychloride is dissolved; and
recovering the second rare-earth oxychloride from an insoluble matter which is not dissolved in the liquid.

9. The method for separating and recovering a plurality of rare-earth elements according to claim 8,
wherein the organic solvent is an alcohol.

10. The method for separating and recovering a plurality of rare-earth elements according to claim 8,
wherein the first rare-earth oxychloride is an oxychloride containing dysprosium.

11. The method for separating and recovering a plurality of rare-earth elements according to claim 8,
wherein the second rare-earth oxychloride is an oxychloride containing neodymium.

12. A method for separating and recovering a plurality of rare-earth elements, the method comprising the steps of:
heating a composition containing a plurality of rare-earth elements in a chlorine atmosphere, thereby forming a mixture containing a rare-earth oxychloride and a rare-earth chloride, the rare-earth oxychloride comprising a first rare-earth element, the rare-earth chloride comprising a second rare-earth element different from the first rare-earth element;
introducing the mixture into a liquid containing an organic solvent, thereby obtaining an insoluble matter containing the rare-earth oxychloride and a liquid in which the rare-earth chloride is dissolved;
recovering the rare-earth oxychloride from the insoluble matter; and
recovering the rare-earth chloride from the liquid in which the rare-earth chloride is dissolved.

13. The method for separating and recovering a plurality of rare-earth elements according to claim 12,
wherein the organic solvent is an alcohol.

14. The method for separating and recovering a plurality of rare-earth elements according to claim 12,
wherein the rare-earth oxychloride is an oxychloride containing dysprosium.

15. The method for separating and recovering a plurality of rare-earth elements according to claim 12,
wherein the rare-earth chloride is a chloride containing neodymium.

16. A method for separating and recovering a plurality of rare-earth elements, the method comprising the steps of:
heating a composition containing a plurality of rare-earth elements in a chlorine atmosphere, thereby forming a mixture containing a first rare-earth oxychloride and a second rare-earth oxychloride, the first rare-earth oxychloride comprising a first rare-earth element, the second rare-earth oxychloride comprising a second rare-earth element different from the first rare-earth element;
introducing the mixture into a liquid, thereby obtaining a liquid in which the first rare-earth oxychloride is dissolved;
recovering the first rare-earth oxychloride from the liquid in which the first rare-earth oxychloride is dissolved; and
recovering the second rare-earth oxychloride from an insoluble matter which is not dissolved in the liquid.

17. The method for separating and recovering a plurality of rare-earth elements according to claim 16,
wherein the first rare-earth oxychloride is an oxychloride containing dysprosium.

18. The method for separating and recovering a plurality of rare-earth elements according to claim 16, wherein the second rare-earth oxychloride is an oxychloride containing neodymium.

19. A method of separating and recovering a plurality of rare-earth elements, the method comprising the steps of:
heating a composition containing a plurality of rare-earth elements in a chlorine atmosphere, thereby forming a mixture containing a first rare-earth oxychloride and a second rare-earth oxychloride, the first rare-earth oxychloride comprising a first rare-earth element, the second rare-earth oxychloride comprising a second rare-earth element different from the first rare-earth element;
introducing the mixture into a liquid containing an organic solvent, thereby obtaining a liquid in which the first rare-earth oxychloride is dissolved;
recovering the first rare-earth oxychloride from the liquid in which the first rare-earth oxychloride is dissolved; and
recovering the second rare-earth oxychloride from an insoluble matter which is not dissolved in the liquid.

20. The method for separating and recovering a plurality of rare-earth elements according to claim 19,
wherein the organic solvent is an alcohol.

21. The method for separating and recovering a plurality of rare-earth elements according to claim 19,
wherein the first rare-earth oxychloride is an oxychloride containing dysprosium.

22. The method for separating and recovering a plurality of rare-earth elements according to claim 19,
wherein the second rare-earth oxychloride is an oxychloride containing neodymium.

* * * * *